(12) United States Patent
Kiuchi et al.

(10) Patent No.: US 7,956,927 B2
(45) Date of Patent: Jun. 7, 2011

(54) VIDEO SIGNAL CONVERTER AND VIDEO DISPLAY DEVICE

(75) Inventors: Shinya Kiuchi, Osaka (JP); Jun Ikeda, Fukuoka (JP); Shuichi Ojima, Osaka (JP); Tsuyoshi Hirashima, Osaka (JP); Ryouta Hata, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1232 days.

(21) Appl. No.: 11/597,411

(22) PCT Filed: Oct. 26, 2005

(86) PCT No.: PCT/JP2005/019686
§ 371 (c)(1),
(2), (4) Date: Nov. 22, 2006

(87) PCT Pub. No.: WO2006/049058
PCT Pub. Date: May 11, 2006

(65) Prior Publication Data
US 2008/0198263 A1    Aug. 21, 2008

(30) Foreign Application Priority Data

Nov. 5, 2004  (JP) .................................. 2004-321780

(51) Int. Cl.
H04N 7/01 (2006.01)
H04N 5/66 (2006.01)
(52) U.S. Cl. .......................... 348/441; 348/679; 348/739
(58) Field of Classification Search .................. 348/441, 348/679, 377, 68–71, 582, 609, 615, 677–678, 348/687–689; 345/589, 44, 204, 690, 699; H04N 7/01, 5/66
See application file for complete search history.

(56) References Cited

U.S. PATENT DOCUMENTS

| 6,335,734 | B1 * | 1/2002 | Nagae et al. .................. 345/589 |
| 6,791,566 | B1 | 9/2004 | Kuratomi et al. |
| 7,643,095 | B2 * | 1/2010 | Yoshii .......................... 348/687 |
| 2005/0248594 | A1 | 11/2005 | Usui et al. |

FOREIGN PATENT DOCUMENTS
CN    1500346    5/2004
(Continued)

OTHER PUBLICATIONS

Supplementary European Search Report issued Dec. 30, 2009 in Application No. EP 05 79 8986.

*Primary Examiner* — Trang U Tran
(74) *Attorney, Agent, or Firm* — Wenderoth, Lind & Ponack, L.L.P.

(57) ABSTRACT

A video signal converter has a target pixel setting unit which sets up a position of a target pixel of an input video signal, a position parameter feeding unit which supplies a position parameter depending on the position of the target pixel set by the target pixel setting unit, and a characteristic amount calculating unit which calculates a characteristic amount of the input video signal. The video signal converter also has a detection-threshold setting unit which sets up a detection threshold based on the characteristic amount calculated by the characteristic amount calculating unit, a compensation parameter setting unit which determines a compensation parameter based on the position parameter supplied by the position parameter feeding unit and the detection threshold set by the detection-threshold setting unit, and a multiplier which converts a signal of the target pixel set by the target pixel setting unit in the input video signal, based on the compensation parameter determined by the compensation parameter setting unit, and outputs the conversion result.

13 Claims, 10 Drawing Sheets

FOREIGN PATENT DOCUMENTS

| | | |
|---|---|---|
| EP | 1 237 138 | 9/2002 |
| EP | 1 591 990 | 11/2005 |
| JP | 2001-309280 | 11/2001 |
| JP | 2002-116728 | 4/2002 |
| JP | 2002-281346 | 9/2002 |
| JP | 2003-345297 | 12/2003 |

\* cited by examiner

VIDEO SIGNAL CONVERTER AND VIDEO DISPLAY DEVICE

TECHNICAL FIELD

The present invention relates to the video signal converter which can reduce the power consumption of electronic equipment, and arts related thereto.

BACKGROUND ART

In recent years, environmental consciousness has increased and it is an important subject to reduce the power consumption of electronic equipment. In a video display device which displays a video signal, especially a video display device using a self-luminous light element (for example, a PDP (plasma display panel) or an organic EL device), reduction of power consumption is important and power-saving technology is required. A document 1 (Published Japanese patent application 2002-116728) discloses a technology for power-saving. According to the document 1, a characteristic amount calculating unit extracts the average luminance level of an input video signal (or the average picture level: APL), and a conversion processing unit converts the input video signal according to the extracted average luminance level.

In the conventional art, the average luminance level of the input video signal is regarded as an index of power consumption reduction. Therefore, when a plurality of video signals expressing mutually different images are inputted, if the average luminance level of these images is constant, the processing for reducing power consumption will become the same (regardless of how to control the image so that the average luminance level of the image becomes constant, as long as the average luminance level of the image itself is constant).

A new technology which can further reduce the power consumption of electronic equipment based on the conventional art is required.

SUMMARY OF THE INVENTION

In view of the above, an object of the present invention is to provide a video signal converter and a video display device that can further improve the power-saving effect.

A first aspect of the present invention provides a video signal converter comprising: a target pixel setting unit operable to set a target pixel position in an input video signal; a position parameter feeding unit operable to feed a position parameter depending on the target pixel position set by the target pixel setting unit; a characteristic amount calculating unit operable to calculate characteristic amount of the input video signal; a detection-threshold setting unit operable to set a detection threshold, based on the characteristic amount calculated by the characteristic amount calculating unit; a compensation parameter setting unit operable to determine a compensation parameter, based on the position parameter fed by the position parameter feeding unit and on the detection threshold set by the detection-threshold setting unit; and a conversion unit operable to convert a signal of the target pixel set by the target pixel setting unit in the input video signal, based on the compensation parameter determined by the compensation parameter setting unit, thereby outputting a conversion result.

In the present structure, the detection-threshold setting unit sets up the detection threshold based on the characteristic amount which the characteristic amount calculating unit computes, the compensation parameter setting unit determines the compensation parameter, based on the position parameter which the position parameter feeding unit supplies and the detection threshold which the detection-threshold setting unit sets up, the conversion unit converts the signal of the target pixel set up by the target pixel setting unit in the input video signal, and outputs the conversion result. Thereby, the detection threshold can be reflected in conversion of the input video signal. That is, compensation for reducing power consumption can be performed more positively in a region where human eyes are difficult to sense degradation of the image quality; thereby, the power-saving effect can be improved more than practicing reduction of power consumption only depending on the characteristic amount.

A second aspect of the present invention provides the video signal converter, wherein the position parameter feeding unit feeds the position parameter so that the position parameter at the position of the target pixel follows a Gaussian distribution as a function of a distance from a specific point to the position of the target pixel on a display screen image which is constituted by the input video signal.

According to the structure, the power-saving compensation can be performed in such a way that the effect of the compensation is weakened near the specific point to suppress the deterioration of the appearance of image quality, but that the effect of the compensation is strengthened in a position distant from the specific point to reduce power consumption more positively; thereby, the power-saving effect can be improved more than practicing reduction of power consumption only depending on the characteristic amount. Moreover, since the above-mentioned Gaussian distribution is adopted, the effect of the compensation not only changes continuously but also increases steeply as the distance from the specific point increases. Therefore, the power consumption is further reducible.

A third aspect of the present invention provides the video signal converter, wherein frequency components of the input video signal are used to determine the characteristic amount and the detection threshold.

According to the structure, the characteristic amount and the detection threshold can be changed as the frequency components of the input video signal change.

A fourth aspect of the present invention provides the video signal converter, wherein average luminance of the input video signal is used to determine the characteristic amount and the detection threshold.

According to the structure, the characteristic amount and the detection threshold can be changed as the average luminance of the input video signal changes.

A fifth aspect of the present invention provides the video signal converter, wherein the position parameter feeding unit further comprises: an area dividing unit operable to divide a display screen image constituted by the input video signal into a plurality of areas, wherein the characteristic amount calculating unit calculates the characteristic amount of the input video signal to each of the plurality of areas divided by the area dividing unit, and wherein the position parameter feeding unit feeds the position parameter, depending on a target pixel position which is set by the target pixel setting unit to each of the plurality of areas divided by the area dividing unit.

According to the structure, the display screen image constituted by the input video signal is divided into a plurality of regions, and the video signal is compensated according to the property of these regions. Therefore, the compensation can be performed more finely than the uniform compensation performed to the entire display screen image; thereby, the power consumption can be reduced further.

A sixth aspect of the present invention provides the video signal converter, wherein the position parameter feeding unit further comprises: a template for detecting a specific object; an area judging unit operable to determine, utilizing the template, an area where the specific object exists and an area where the specific object does not exist, in a display screen image constituted by the input video signal, thereby generating a judgment result; and an area-based position parameter calculating unit operable to determine the position parameter based on the judgment result.

According to the structure, in the display screen image constituted by the input video signal, different compensation is performed in the region where the specific object exists and the region where the specific object does not exist. Therefore, depending on the existence or nonexistence of the object, the compensation can be performed more finely than the uniform compensation performed to the entire display screen image; thereby, the power consumption can be reduced further.

A seventh aspect of the present invention provides the video signal converter further comprising: an illuminance sensor; and a detection-threshold compensating unit, wherein the detection-threshold compensating unit compensates the detection threshold set by the detection-threshold setting unit, based on a detection result by the illuminance sensor, and wherein the compensation parameter setting unit determines the compensation parameter, based on the position parameter fed by the position parameter feeding unit and on the detection threshold compensated by the detection-threshold compensating unit.

According to the structure, the luminance of external environment can be detected by the illuminance sensor, and the result can be reflected in the compensation. Since the detection threshold of human eyes changes considerably depending on the luminance of the external environment, the present scheme leads to the realization of more precise compensation based on the detection threshold; thereby, power consumption can be reduced further.

An eighth aspect of the present invention provides the video signal converter further comprising: a color converter operable to convert a color space of the input video signal into a first color space composed of a luminance component and non-luminance components; and an inverse color converter operable to inversely convert a video signal in the first color space into the color space of the input video signal, wherein the characteristic amount calculating unit, the detection-threshold setting unit, the compensation parameter setting unit, and the conversion unit perform their respective processing, based on the luminance component converted by the color converter, and wherein the inverse color converter converts inversely both of the conversion result outputted by the conversion unit and the non-luminance components converted by the color converter, into the color space of the input video signal.

According to the structure, even if the input video signal is expressed in different color space from the color space where the compensation is performed, the video conversion of the input video signal can be carried out with no difficulty; therefore, power consumption can be reduced further.

A ninth aspect of the present invention provides a video display device further comprising: a selector operable to select alternatively the input video signal and the conversion result outputted by the video signal converter, thereby supplying the display device with the selected result; and a switching control unit operable to control the selector.

According to the structure, by the control of the switching control unit over the selector, the video signal for which the video conversion is performed, and the video signal for which the video conversion is not performed can be supplied alternatively to the display device. Therefore, either of the case where a user wants to perform the video conversion and to give priority to reduction of power consumption, and the case where the user does not want to perform the video conversion but wants to display the image in high quality can be responded flexibly.

A tenth aspect of the present invention provides the video display device, further comprising: an input unit operable to provide the switching control unit with switching directions for the selector, wherein the switching control unit controls the selector in accordance with the switching directions provided by the input unit, and wherein the switching control unit provides the display device with a status signal indicating a state of the selector.

According to the structure, a user only enters an item into the input unit and can supply alternatively to the display device the video signal for which the video conversion is performed, and the video signal for which the video conversion is not performed. Moreover, since the status signal is supplied to the display device, the user can acquire, through the displayed result on the display device, information that the video conversion is performed and the reduction of power consumption is prioritized currently, or information that the video conversion is not performed but the image is displayed in high quality.

An eleventh aspect of the present invention provides the video display device, wherein the display device outputs a status signal to the switching control unit, based on the switching directions for the selector, and wherein the switching control unit controls the selector, based on the status signal from the display device.

According to the structure, it is not necessary to provide an input unit in the video signal converter. A user only operates the display device and can supply alternatively to the display device the video signal for which the video conversion is performed, and the video signal for which the video conversion is not performed.

According to the present invention, the video conversion is performed positively in a region where image quality degradation is hard to be sensed; thereby, the power-saving effect is improved.

BRIEF DESCRIPTION OF THE DRAWINGS

FIG. 3 (a) is a distribution map of the position parameter in Embodiment 1 of the present invention;

FIG. 3 (b) is a distribution map of the position parameter in Embodiment 1 of the present invention;

FIG. 6 (a) is a distribution map of the position parameter in Embodiment 2 of the present invention;

FIG. 6 (b) is a distribution map of the position parameter in Embodiment 2 of the present invention;

FIG. 8 (*a*) is an exemplification diagram of a template in Embodiment 3 of the present invention;

FIG. 8 (*b*) is an explanatory drawing of person detection in Embodiment 3 of the present invention;

FIG. 8 (*c*) is a distribution map of the position parameter in Embodiment 3 of the present invention;

DETAILED DESCRIPTION OF THE INVENTION

Hereinafter, a description is given of embodiments of the invention with reference to the accompanying drawings.

Embodiment 1

Figure 1:
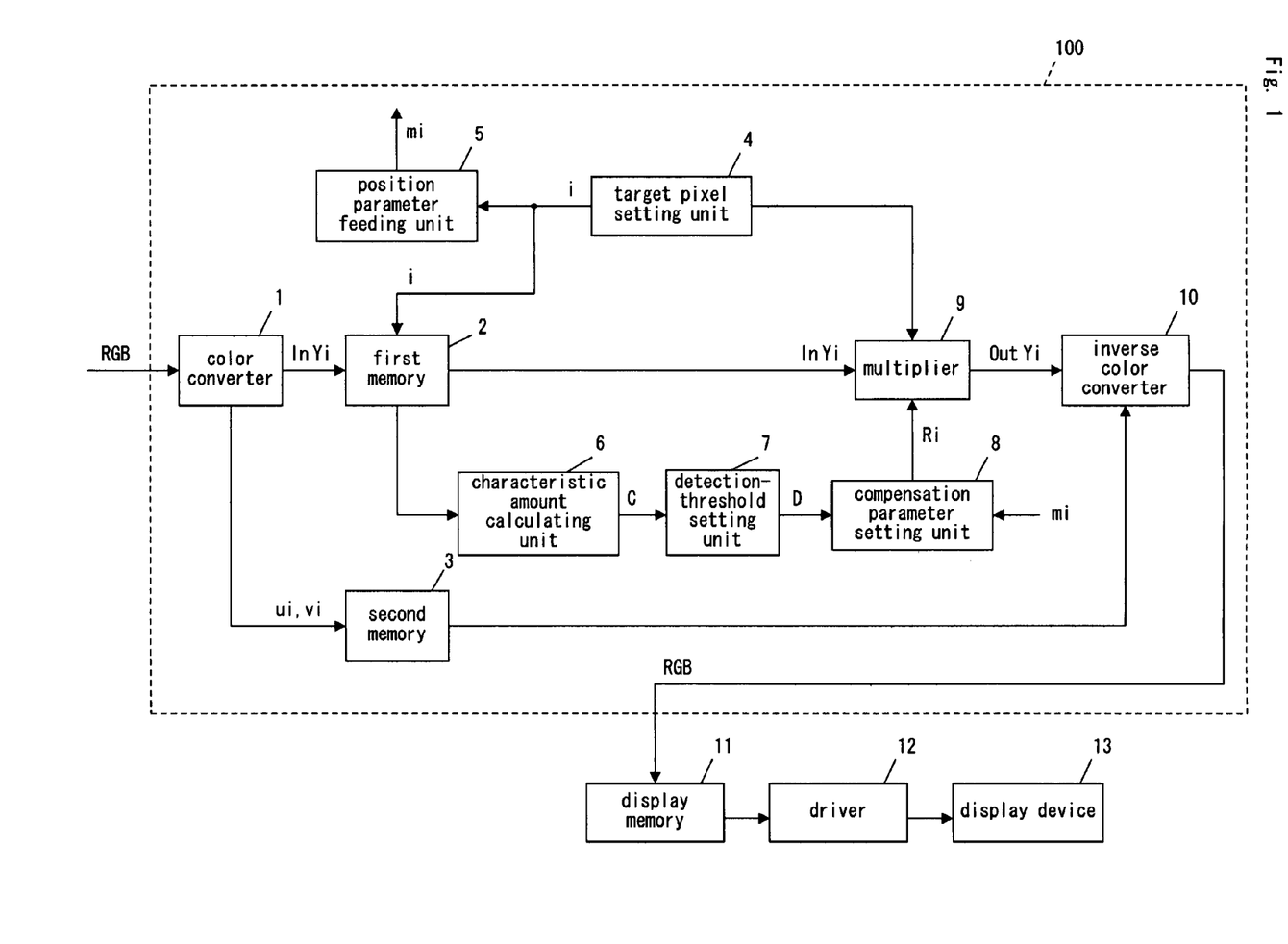
FIG. 1 is a block diagram illustrating a video display device in Embodiment 1 of the present invention.

FIG. 1 is a block diagram illustrating a video display device in Embodiment 1 of the present invention. In FIG. 1 and the following figures, a subscript i is given to variables (input video signal InYi, output video signal OutYi, compensation-parameter Ri, position parameter mi) which are updated in units of a pixel unit, in order to indicate that the variables are dependent on Pixel i (the coordinates (xi, yi)); however, the subscript i is not given to variables (characteristic amount C, detection threshold D) which are updated in units of a frame unit or an area unit.

Before explaining the detailed construction of the video display device of the present embodiment, the important concept in the present invention (characteristic amount, detection threshold) is explained first.

(Characteristic Amount)

In the present embodiment, the sum of squares (power) of the frequency components of the input video signal in a specific region is expressed as characteristic amount C, and the power-saving effect is improved by using the characteristic amount C. To describe more specifically, the input video signal InYi in the present embodiment is a luminance signal (Y component) of a Yuv color space, and the characteristic amount C is given by the power in a 0-1 cpd frequency band of the Fourier-transformed input video signal InYi, as expressed by the following equation. Here, cpd stands for "cycles per degree" of visual angle. For example, assume that the number of pixels in the horizontal direction of a display screen image is 1024, and that the visual angle is 33 degrees, then the highest value of spatial frequency is about 15.5 cpd.

$$C = \int_{0cpd}^{1cpd} |F(\omega)|^2 d\omega \quad \text{(Equation 1)}$$

Where, F (w) is the result of the Fourier transform of the input video signal InYi. A low pass filter may be used instead of the Fourier transform. By this means, the circuit scales can be made smaller than the case where the Fourier transform is employed.

A document 2 ("Sensation/Perception Handbook" SBN-414-30503-9C3011, pp. 346-348) teaches the phenomenon in which the appearance of brightness in a high luminance area falls by the Craik-O'Brien illusion, if an edge exists on the display screen image. According to this phenomenon, if a plurality of edges exist in the display screen image, in the circumference area of the edges, the sensitivity of brightness will fall relatively (in other words, a luminance variation becomes difficult to be sensed). Power will become high if many edges exist in a picture. Therefore, in a picture with high power, it can be said that the luminance difference at the center and at the circumference of the display screen image may be increased. The present inventors have tried to improve the power-saving effect more than the conventional art, employing this property.

(Detection Threshold)

A detection threshold D is defined as follows. In a certain picture, let the brightness at the center of the display screen image be a maximum "1". When the brightness of the display screen image is equal to the maximum "1" in the entire display screen image from the center to the circumference, nobody perceives the variation of brightness.

If the brightness in the circumference of the display screen image is gradually lowered from the maximum "1", reached in due course is the detection threshold D where the number of those who perceive the variation of brightness, and the number of those who do not perceive the variation of brightness become just equal. The experiment of the present inventors has unveiled the fact that the detection threshold D varies depending on the picture.

Figure 2:
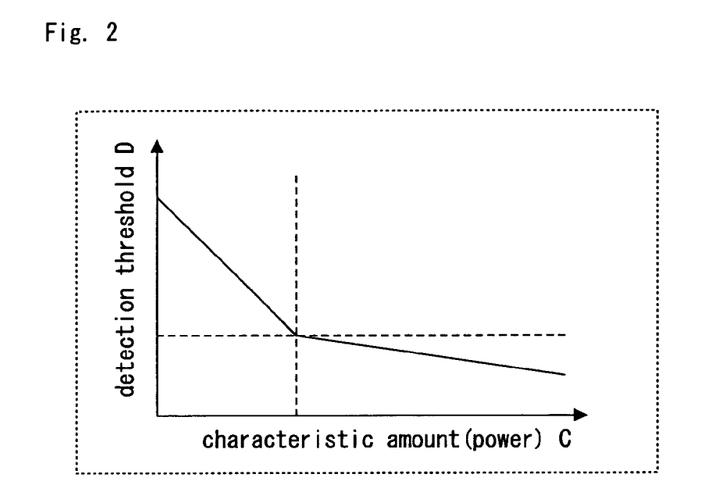
FIG. 2 is a graph illustrating relationship of characteristic amount and detection threshold in Embodiment 1 of the present invention.

The present inventors repeated the subjectivity evaluation experiment to obtain the detection threshold D about various pictures, and summarized the result in a graph as shown in FIG. 2. In FIG. 2, the horizontal axis is characteristic amount C (power), and the vertical axis is a detection threshold D. FIG. 2 shows clearly a tendency that the detection threshold D becomes smaller on the whole as the characteristic amount C (power) increases. FIG. 2 also shows a property that the detection threshold D possesses a large absolute value of slope in a region where the characteristic amount C (power) is small but a small absolute value of slope in a region where the characteristic amount C (power) is large.

As described above, in the video signal converter of the present embodiment, the characteristic amount and the detection threshold are defined by the power of the input video signal.

Based on the above argument, the video display device of the present embodiment is composed as follows. A video signal converter 100 performs the video conversion of the input video signal, and stores the result (display data) in a display memory 11 which is composed of VRAM etc. A driver 12 controls a display device 13 based on the display data stored in the display memory 11, consequently the display data is displayed on a display screen of the display device 13.

In the present embodiment, it is assumed that the display device 13 is composed of one of self-luminous type displays (PDP, organic EL, LCD, etc.). However, the display device 13 may be composed of a Braun tube etc. In that case, the display memory 11 and the driver 12 can be omitted.

The video signal converter 100 comprises the following elements. A color converter 1 converts the color space RGB of the input video signal into the Yuv color space which is composed of a luminance component (InYi) and non-luminance components (ui, vi). An inverse color converter 10 performs inverse conversion of the output video signal OutYi in the Yuv color space into a signal in the RGB color space.

In this way, in the present embodiment, both of the input video signal and the output video signal are expressed in the RGB color space and the internal processing of the video signal converter 100 is performed in the Yuv color space.

However, the luminance component used by the internal processing of the video signal converter 100 may be other various luminance components, such as a luminance component (Y) of the YCbCr color space. If the conversion of color space is unnecessary, the color converter 1 or the inverse color converter 10 can be omitted. The well-known conversion equations may be used as the conversion equation which the color converter 1 or the inverse color converter 10 uses. Since the color conversion/inverse color conversion is not the main point of the present invention, the detailed explanation thereof is omitted.

A first memory 2 stores one frame of the luminance component (namely, the input video signal InYi) outputted by the color converter 1, and a second memory 3 stores one frame of the non-luminance components (namely, the input video signals ui and vi) outputted by the color converter 1. The input video signal InYi stored by the first memory 2 undergoes video conversion performed by the elements described below, and is outputted to the inverse color converter 10. The input video signals ui and vi stored by the second memory 3 are outputted to the inverse color converter 10 as they are.

A target pixel setting unit 4 sets up a target pixel i in the display screen image composed by the input video signal InYi, and outputs the target pixel i to the first memory 2 and a position parameter feeding unit 5. The first memory 2, upon receiving the target pixel i from the target pixel setting unit 4, outputs an input video signal InYi of the target pixel i to a multiplier 9 and a characteristic amount calculating unit 6.

The position parameter feeding unit 5 supplies a position parameter mi depending on the target pixel i which the target pixel setting unit 4 sets up. The position parameter mi changes depending on the coordinates (xi, yi) of the target pixel i. Therefore, even if a video signal in which all pixels possess a uniform color is inputted, the video signal will be converted by the position parameter mi and different colors will be displayed at different pixels in the converted video signal.

In the present embodiment, the position parameter feeding unit 5 calculates the position parameter mi of the target pixel i by the following equation.

$$r_i = \sqrt{\{a(x_i - x_0)\}^2 + \{b(y_i - y_0)\}^2}$$
$$m_i = K \times \exp(-r_i^2)$$
(Equation 2)

Where, (x0, y0) are the coordinates of the central point P0 of the display screen image, ri is the distance between the central point P0 (x0, y0) and the target pixel i (the coordinates (xi, yi)), K is a constant of the Gaussian function, and a and b are positive constants which are set corresponding to the aspect ratio of the display screen image, such as a:b=4:3 or a:b=16:9.

Figure 3A:
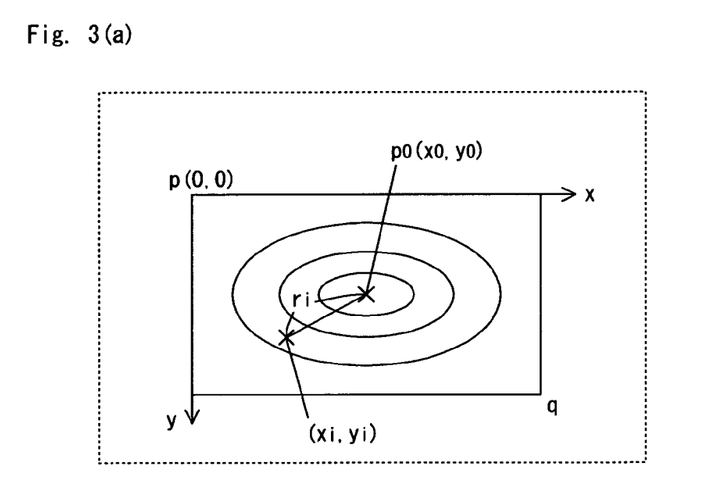
Figure 3B:
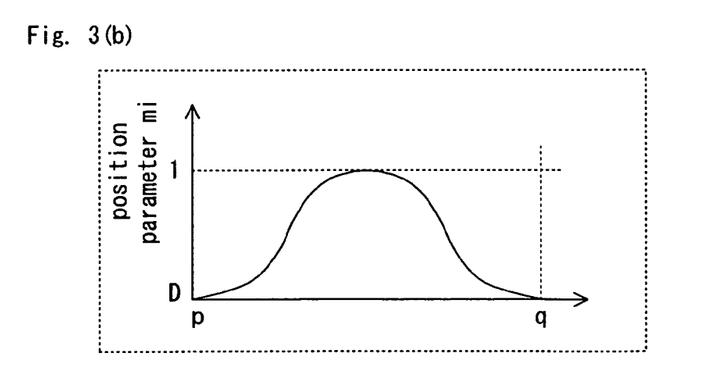

FIG. 3 (a) shows equi-value contours of the position parameter mi. If the distribution of the position parameter mi is cut by the line segment pq of FIG. 3 (a), the distribution becomes a convex Gaussian distribution as shown in FIG. 3 (b).

The characteristic amount calculating unit 6 inputs the input video signal InYi and calculates the characteristic amount C (power) of the input video signal, using Equation 1 as described above.

A detection-threshold setting unit 7 possesses a data table which corresponds to the graph of FIG. 2, and through the use of this table, sets up a detection threshold D from the characteristic amount C which the characteristic amount calculating unit 6 calculates. That is, the detection-threshold setting unit 7 compensates the characteristic amount C.

A compensation parameter setting unit 8 determines a compensation parameter Ri by the following equation, based on the position parameter mi supplied by the position parameter feeding unit 5 and the detection threshold D set by the detection-threshold setting unit 7.

$$R_i = 1 - (1 - n_i) \times D$$
(Equation 3)

The multiplier 9 corresponds to the conversion unit. By the following equation, based on the compensation parameter Ri determined by the compensation parameter setting unit 8, the multiplier 9 converts the input video signal InYi of the target pixel i, and outputs the conversion result as the output video signal OutYi to an inverse color converter 10. When the multiplier 9 outputs one piece of output video signal OutYi, the target pixel setting unit 4 advances the target pixel i to the next pixel.

$$\text{Out}Y_i = \text{In}Y_i \times R_i$$
(Equation 4)

According to the present embodiment, the following effects are expected.

(Effect 1) It has been clarified by the experiment of the present inventors that, when the luminance in the circumference region is lowered compared to the central point P0 of the display screen image, the change may be easy to sense in one case but hard to sense in another case, depending on the video signal. Since the correction value Ri is determined adaptively based on the input video signal in the present embodiment, power consumption can be reduced effectively, maintaining the appearance of image quality.

(Effect 2) When the average luminance of an input picture is constant, the same processing is performed in the conventional art. However, in the present embodiment, even if the average luminance of the input picture is constant, the video conversion processing changes in detail according to the input video signal. Therefore, a power-saving effect can be improved much more than in the conventional art.

(Effect 3) Even when an average luminance is constant or controlled to be constant, the input picture undergoes the video conversion so that the central point P0 of the display screen image may become brighter than the circumference, therefore, the appearance of brightness can be increased more.

The present embodiment can be changed as follows.

(Changed Item 1) In the present embodiment, the characteristic amount calculating unit 6 updates the detection threshold D for every frame. However, the characteristic amount calculating unit 6 may limit the detection threshold D so that the absolute value of the difference between the detection threshold D' of the previous frame and the detection threshold D of the present frame may not exceed a fixed value. By this means, a flicker of the display screen image can be suppressed.

(Changed Item 2) The characteristic amount calculating unit 6 may calculate the characteristic amount by performing weighting as a function of the position of the target pixel i. Although the circumference region of the display screen image tends to become the darkest due to the Gaussian distribution, the degree of the darkness can be adjusted if the weighting is performed (for example, the circumference region is made brighter).

(Changed Item 3) The characteristic amount calculating unit 6 may calculate the characteristic amount not based on the video signal of the entire display screen image but based on the video signal of some part of the display screen image (for example, in a fixed region set at the center region of the display screen image in advance). By this means, the operation amount is reduced and processing can be accelerated.

(Changed Item 4) In the present embodiment, the characteristic amount calculating unit 6 calculates only power as the characteristic amount C. However, the characteristic amount calculating unit 6 may calculate several kinds of characteristic amount (for example, power and average luminance, etc.), and the image conversion may be performed reflecting such kinds of characteristic amount. Saturation, luminance, skin color, contrast, etc. can be also used as the characteristic amount. However, according to the experiment by the present inventors, it is confirmed that when frequency components are used, the effect in reducing power consumption is large, while maintaining the appearance of image quality.

Figure 4:
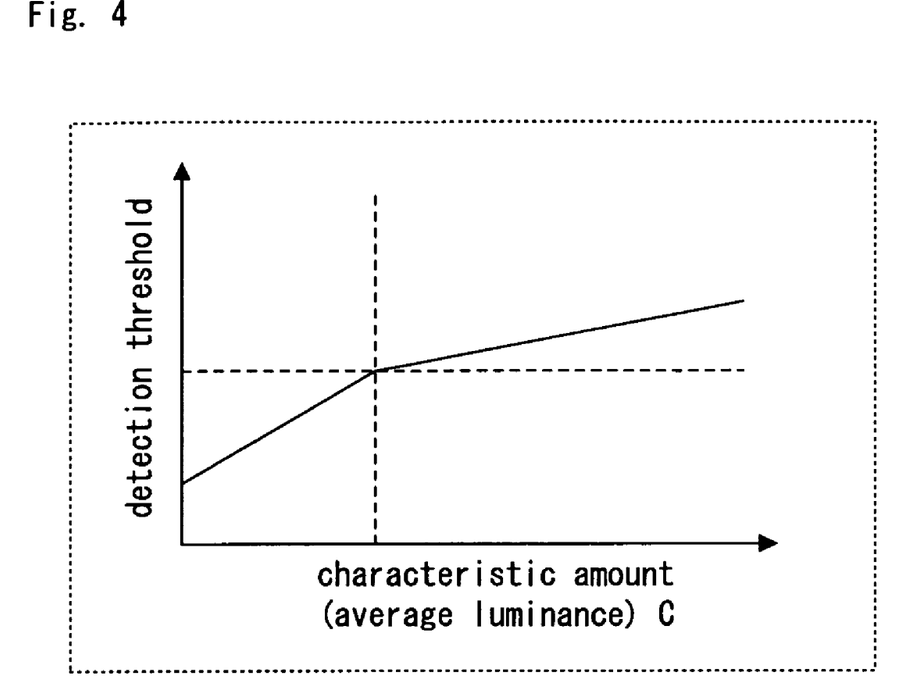
FIG. 4 is a graph illustrating relationship of characteristic amount and detection threshold in Embodiment 1 of the present invention.

(Changed Item 5) The average luminance of the input video signal InYi may be used to determine the characteristic amount C and the detection threshold D. FIG. 4 is a graph illustrating relationship between the characteristic amount C (average luminance) and the detection threshold D (average luminance). This figure shows the property which became clear as a result of the subjectivity evaluation experiments repeatedly performed by the present inventors, like the above-mentioned experiment. What is necessary in using the property of FIG. 4 is just to change the contents of processing of the characteristic amount calculating unit 6 and the detection-threshold setting unit 7 in FIG. 1. Even by this means, the video conversion can be carried out reflecting the property shown in FIG. 4, and the power-saving effect can be improved much more, while maintaining the appearance of image quality, compared with a case where the no-compensation characteristic amount is employed as an index of the video conversion, as in the conventional art.

Embodiment 2

Figure 5:
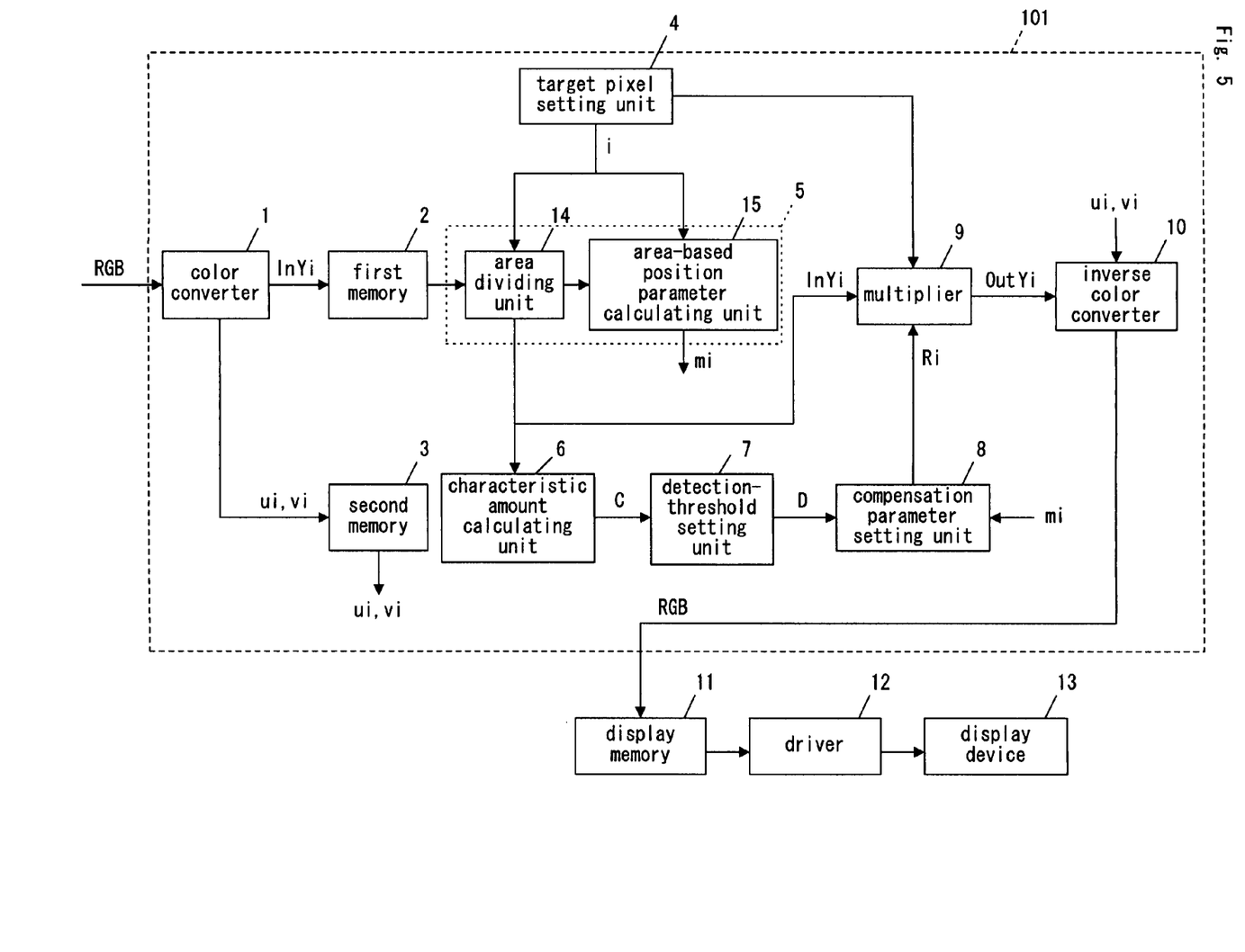
FIG. 5 is a block diagram illustrating a video display device in Embodiment 2 of the present invention.

FIG. 5 is a block diagram illustrating a video display device in Embodiment 2 of the present invention. In the following, the same components as those in FIG. 1 are attached with the same reference symbols or numerals and the descriptions thereof are omitted, and the explanation is made with a focus on difference with Embodiment 1.

In the video signal converter 101 of the present embodiment, the position parameter feeding unit 5 comprises an area dividing unit 14 and an area-based position parameter calculating unit 15. The area dividing unit 14 divides into a plurality of regions the display screen image composed by the input video signal InYi. Region division may be made freely. For example, the region division may be an up-and-down halving division, a right-and-left and up-and-down quaternate division, and others. Parts of adjoining divided areas may overlap each other. If overlapped, the boundary of the adjoining divided areas blurs a little and becomes less conspicuous. This is very favorable. Compensation which obscures the boundary of the adjoining divided areas positively may be performed.

Figure 6A:
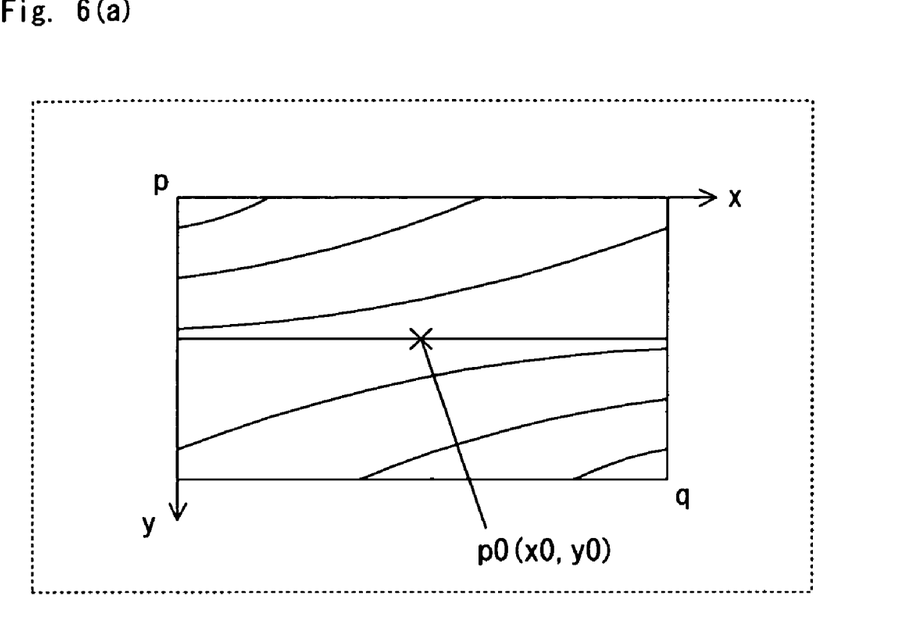
Figure 6B:
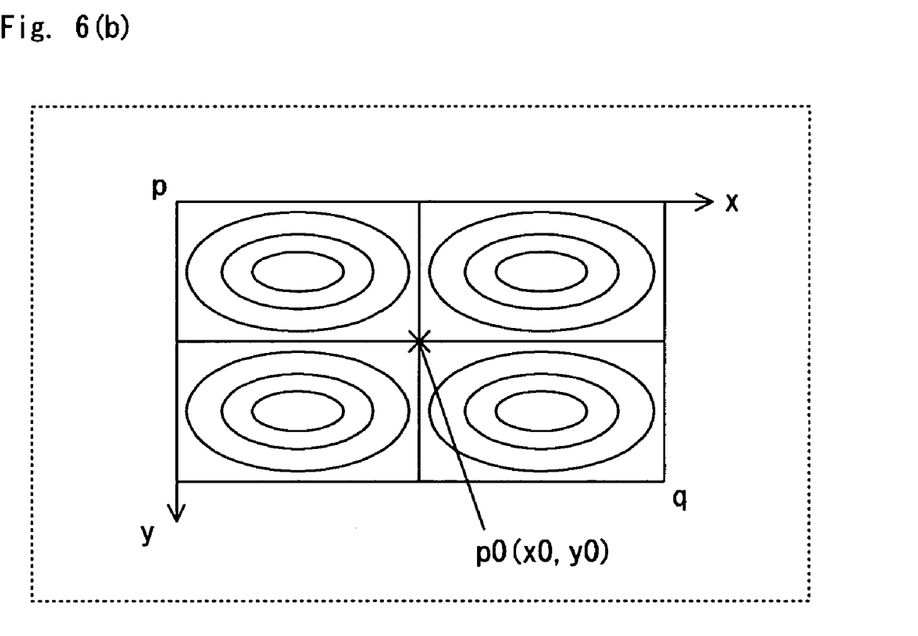

Since the area dividing unit 14 divides a region, the characteristic amount calculating unit 6 of the present embodiment calculates the characteristic amount of the input video signal for every region divided by the area dividing unit 14. The area-based position parameter calculating unit 15 supplies a position parameter mi depending on a target pixel i which the target pixel setting unit 4 sets up for every region divided by the area dividing unit 14. FIG. 6(a) shows an example of position parameter mi for the up-and-down halving division. FIG. 6(b) shows an example of position parameter mi for the right-and-left and up-and-down quaternate division.

In FIGS. 6 (a) and (b), the curves in the rectangles indicate equi-value contours of the position parameter mi.

The area-based position parameter calculating unit 15 may employ the masking effect of the visual angle, and may calculate adaptively a position parameter mi with the same frequency as the input video signal for every divided area.

Embodiment 3

Figure 7:
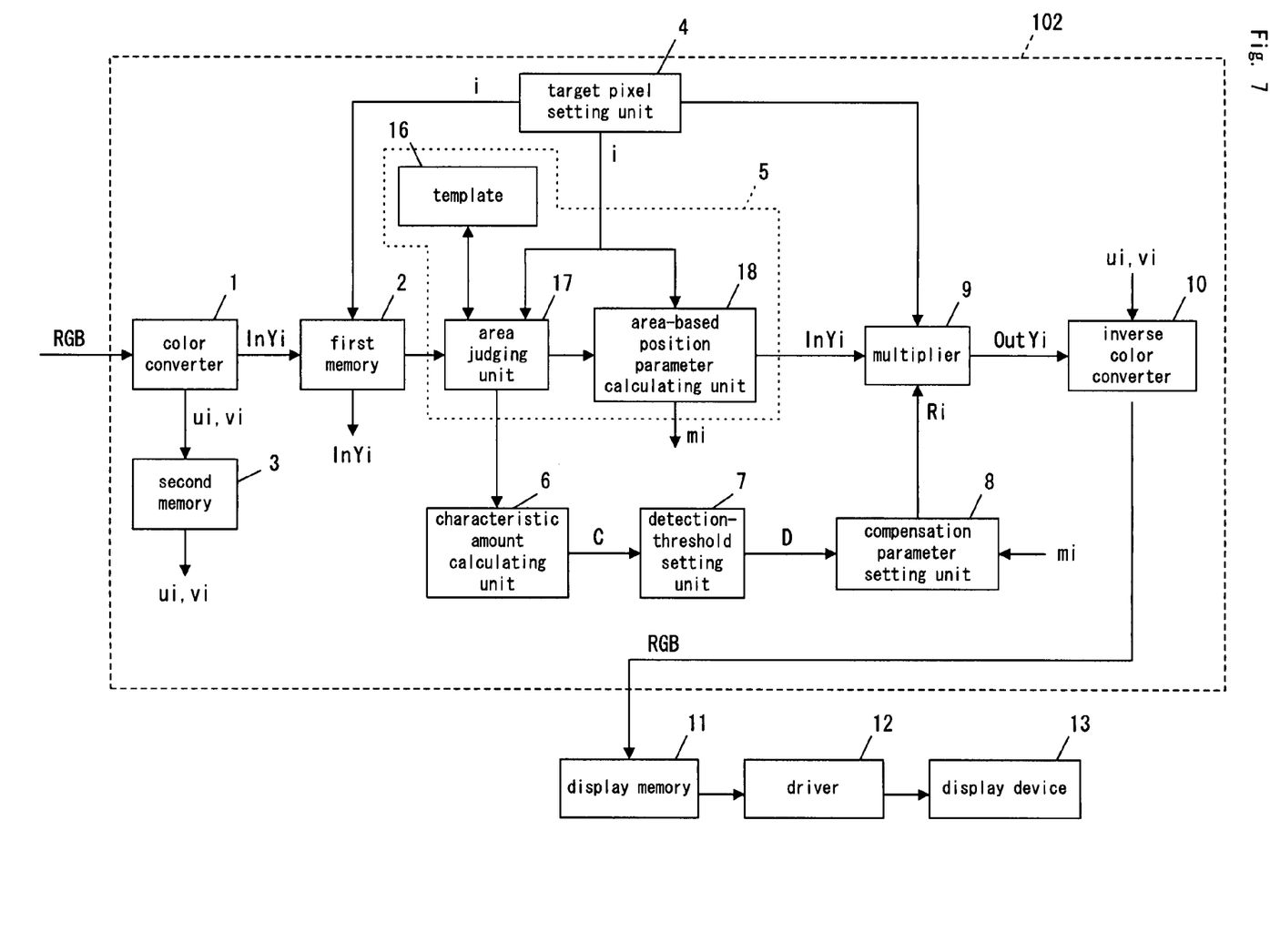
FIG. 7 is a block diagram illustrating a video display device in Embodiment 3 of the present invention.

FIG. 7 is a block diagram illustrating a video display device in Embodiment 3 of the present invention. In the following, the same components as those in FIG. 1 are attached with the same reference symbols or numerals and the descriptions thereof are omitted, and the explanation is made with a focus on difference with Embodiment 1.

Figure 8A:
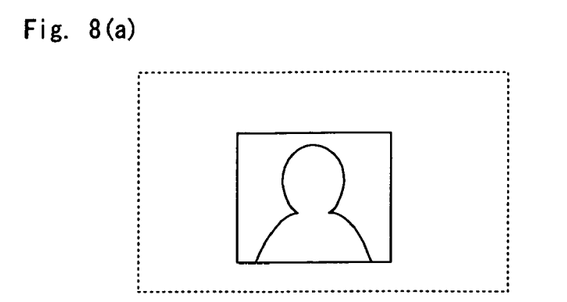

In the video signal converter 102 of the present embodiment, the position parameter feeding unit 5 comprises a template 16, an area judging unit 17, and an area-based position parameter calculating unit 18. The template 16 possesses a person template for detecting a specific object (a person in the present embodiment), as shown in FIG. 8 (a).

Figure 8B:
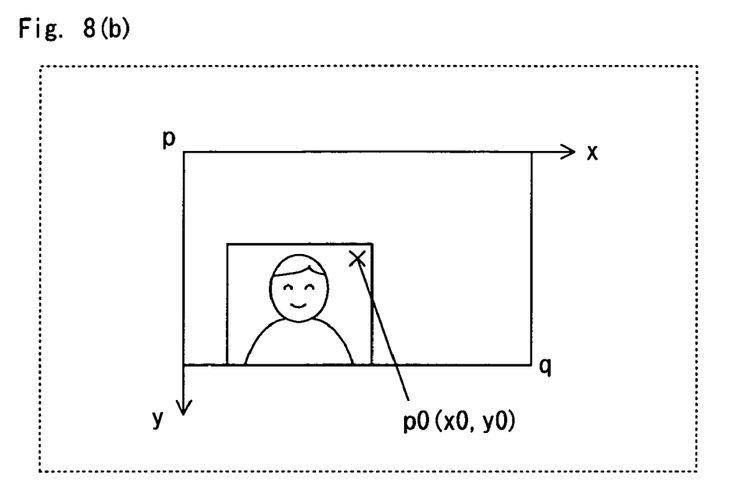

The area judging unit 17 judges the region where the specific object exists in the display screen image composed by the input video signal InYi, and the region where the specific object does not exist, using the template 16, as shown in FIG. 8 (b).

In order to make the above judgment, the characteristic amount calculating unit 6 of the present embodiment calculates the characteristic amount C of the input video signal for each of the regions judged by the area judging unit 17.

Figure 8C:
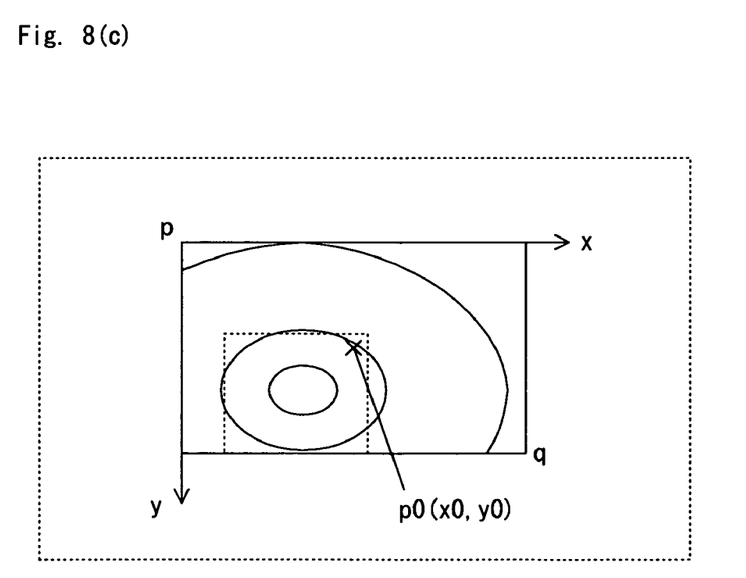

As shown in FIG. 8 (c), the area-based position parameter calculating unit 18 supplies a position parameter mi depending on a target pixel i set by the target pixel setting unit 4 for each of the regions which have been judged by the area judging unit 17.

By the above structure, the distribution profile of the position parameter mi can be made asymmetrical, or can be changed into the form corresponding to the object.

When changing the form corresponding to the object, it is preferable to extract objects, such as a person, the sky, and a plant, to make the position parameter mi of the person or the sky high, and to make the position parameter mi of the plant low. By doing so, the distribution of the position parameter mi corresponding to each object can be generated, and the power-saving effect can be improved.

Embodiment 4

Figure 9:
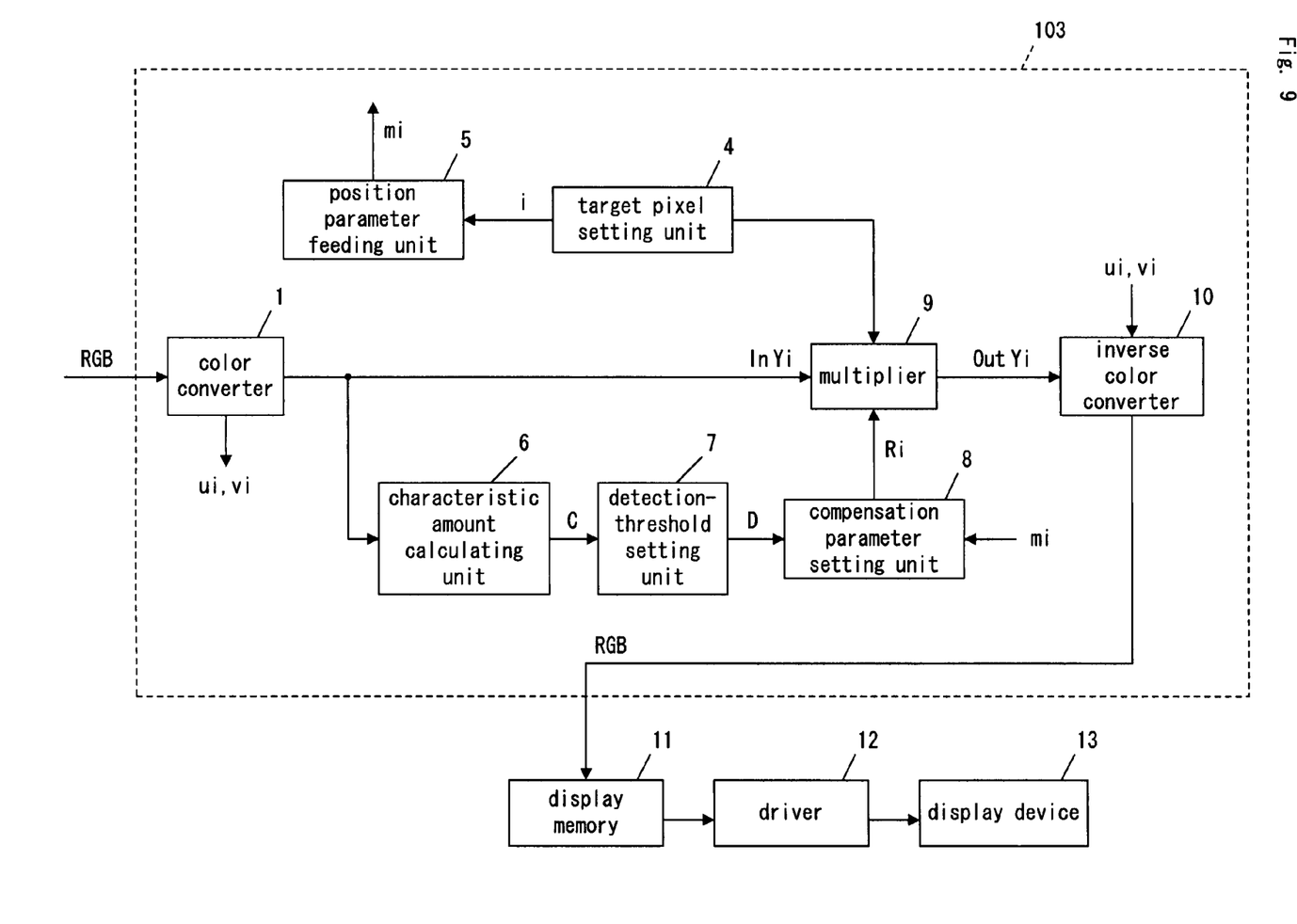
FIG. 9 is a block diagram illustrating a video display device in Embodiment 4 of the present invention.

FIG. 9 is a block diagram illustrating a video display device in Embodiment 4 of the present invention. In the following, the same components as those in FIG. 1 are attached with the same reference symbols or numerals and the descriptions thereof are omitted, and the explanation is made with a focus on difference with Embodiment 1.

In the video signal converter 103 of the present embodiment, the first memory 2 and the second memory 3 which are shown in FIG. 1 concerning Embodiment 1 are omitted, and the characteristic amount calculating unit 6, the detection-threshold setting unit 7, the compensation parameter setting unit 8, and the multiplier 9 perform the respective processing, based on an input video signal for the past display screen image (one frame before in the present embodiment) rather than the display screen image composed by the input video signal InYi.

When the frame changes at high speed (for example, 30 fps), even if the input video signal InYi of the (N+1)-th frame is converted using the characteristic amount C extracted from the N-th frame, the effect on the image quality is small, since the frame changes at high speed. By this means, the circuit scale can be greatly reduced as much as the size of the first-memory 2 and the second memory 3.

Therefore, according to the present embodiment, cost can be suppressed, acquiring an effect almost equivalent to Embodiment 1. This effect is remarkable, especially when the display screen size is large or when the number of colors per pixel is large.

Embodiment 5

Figure 10:
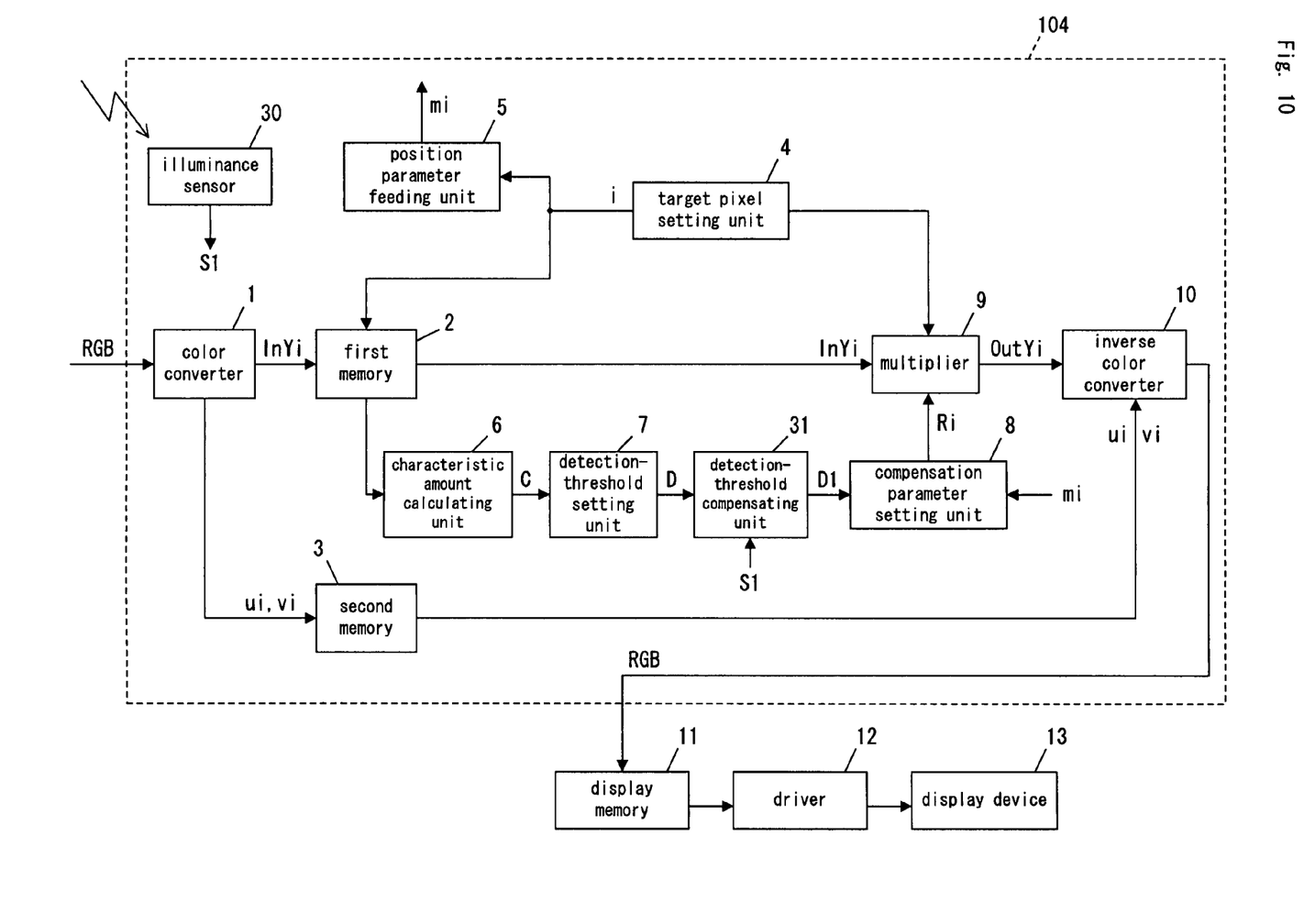
FIG. 10 is a block diagram illustrating a video display device in Embodiment 5 of the present invention.

FIG. 10 is a block diagram illustrating a video display device in Embodiment 5 of the present invention. In the following, the same components as those in FIG. 1 are attached with the same reference symbols or numerals and the descriptions thereof are omitted, and the explanation is made with a focus on difference with Embodiment 1.

In addition to the structure of FIG. 1, the video signal converter 104 of the present embodiment further comprises an illuminance sensor 30 and a detection-threshold compensating unit 31. The detection-threshold compensating unit 31 is provided between the detection-threshold setting unit 7 and the compensation parameter setting unit 8, compensates the detection threshold D set by the detection-threshold setting unit 7, based on a detection result S1 of the illuminance sensor 30, and outputs a compensated detection threshold D1 to the compensation parameter setting unit 8. The compensation parameter setting unit 8 determines the compensation parameter Ri, based on the position parameter mi supplied by the position parameter feeding unit 5 and the compensated detection threshold D1 fed by the detection-threshold compensating unit 31.

When the illuminance sensor 30 measures the illuminance of visual environment and outputs the detection result S1 to the detection-threshold compensating unit 31, the detection-threshold compensating unit 31 calculates a coefficient β corresponding to the illuminance, and obtains the compensated detection threshold $D1=D \times \beta$.

When the illuminance sensor 30 is used, it is possible to suppress unnecessary brightness, according to the visual environment; therefore, a further power-saving effect is attained. Furthermore, it is possible to present a display which is gentle to human eyes, since the brightness of the display screen image is suitably adjusted.

As other visual environment information, the information on the viewing distance to a display device may be used. When the viewing distance is small, the visual angle is large; therefore, it is hard to sense the change even if the compensation parameter Ri is made small. Thereby, the further power-saving effect can be attained.

In addition, when the background of the display device and the video signal are alike, it is preferable to make the variation of the position parameter mi small, with the result of a less conspicuous screen distribution.

When a gamma property is used by the characteristic amount calculating unit 6, the optical intensity can be computed, and when information on electric power is used, the power-saving effect corresponding to the electric power is realizable.

Embodiment 6

Figure 11:
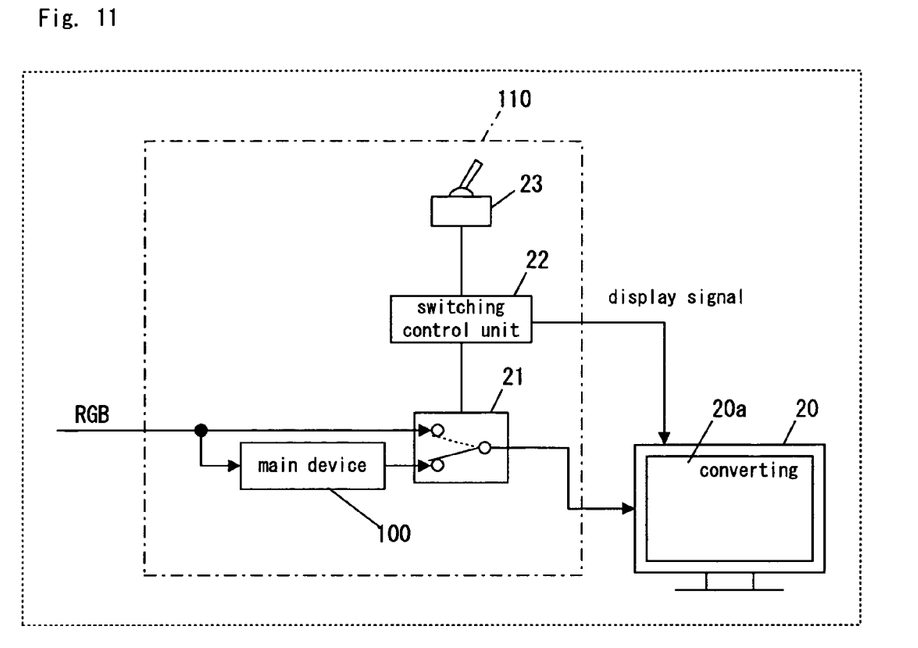
FIG. 11 is a block diagram illustrating a video display device in Embodiment 6 of the present invention.

FIG. 11 is a block diagram illustrating a video display device in Embodiment 6 of the present invention. In the following, the same components as those in FIG. 1 are attached with the same reference symbols or numerals and the descriptions thereof are omitted, and the explanation is made with a focus on difference with Embodiment 1.

A video signal converter 110 of the present embodiment further comprises a selector 21 which selects alternatively an input video signal RGB and the conversion result of the video signal converter 100, thereby feeding the display device with the selected result. The video signal converter 110 further comprises a switching control unit 22 which controls the selector 21, and an input unit 23 which gives the switching directions of the selector to the switching control unit 22.

The switching control unit 22 controls the selector 21 according to the switching directions from the input unit 23, and supplies to the display device 20 the status signal which indicates the state of the selector 21. The display device 20 displays, on a part of the display screen image 20a, information indicating whether conversion by the video signal converter is performed or not.

Since it is very difficult for a user to judge whether the video conversion by the video signal converter 100 is performed or not, from the image quality of the display screen image, the above-mentioned display is preferable. By this means, the user can confirm the state of the video signal converter; therefore, operability (user interface) can be improved.

If the switching control unit 22 maintains the state of a video signal converter 100, irrespective of ON/OFF of the power supply of the video display device 20, it is conveniently unnecessary for the user to set up the video signal converter 100 whenever the user switches on the power supply of the video display device 20.

Embodiment 7

Figure 12:
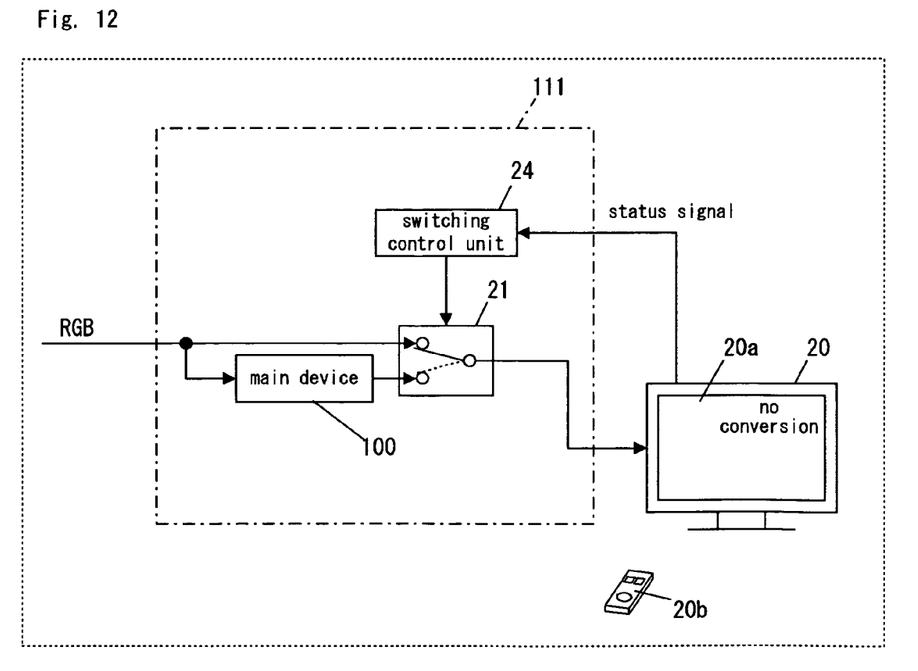
FIG. 12 is a block diagram illustrating a video display device in Embodiment 7 of the present invention.

FIG. 12 is a block diagram illustrating a video display device in Embodiment 7 of the present invention. In the following, the same components as those in FIG. 11 are attached with the same reference symbols or numerals and the descriptions thereof are omitted, and the explanation is made with a focus on difference with Embodiment 6.

In the video display device 111 of the present embodiment, the switching control unit 24 controls the selector 21 according to the status signal from the display device 20.

A display device 20a of the present embodiment comprises a terminal which outputs a status signal, such as a mode of operation, time information, and visual environment, to the switching control unit 24, and the video conversion of the video conversion processing device 100 is enabled or disabled, according to the status signal at the terminal. The mode of operation is a mode which adjusts user image quality, and includes a cinema mode, a dynamic mode, a power-saving mode, a standard mode, and others. The user can set up the mode of operation of the display device 20 using a remote-controller 20b etc. of the display device 20.

By this means, the user does not have to consider whether the video conversion by the video signal converter 100 is being performed, and the enabling/disabling setting of the video conversion is made according to the situation. Therefore, operability (user interface) improves.

As time information, the total time after the power-on of the display device 20 can be considered. If the total time is used, secular change of the display device 20 can be reflected in the video conversion. The hour of use after the power-on may be used as time information. In this case, it is preferable for the switching control unit 24 to control the video signal converter 100 enabling the video conversion when a fixed time has elapsed. This is because, when the user is viewing for a definite period of time without interruption, the user has a habit not to sense the image quality degradation due to fatigue. Therefore, it is possible to practice further power saving, using the habit.

INDUSTRIAL APPLICABILITY

The video converter related to the present invention can be preferably employed, for example, in control of a self-luminous type display device or in its applicable field.

The invention claimed is:

1. A video signal converter comprising:
a target pixel setting unit operable to set a target pixel in an input video signal;
a position parameter feeding unit operable to feed a position parameter depending on a position of the target pixel set by said target pixel setting unit;
a characteristic amount calculating unit operable to calculate a characteristic amount of the input video signal;
a detection-threshold setting unit operable to set a detection threshold, based on the characteristic amount calculated by said characteristic amount calculating unit;
a compensation parameter setting unit operable to determine a compensation parameter, based on the position parameter fed by said position parameter feeding unit and on the detection threshold set by said detection-threshold setting unit; and
a conversion unit operable to convert a signal of the target pixel set by said target pixel setting unit in the input video signal, based on the compensation parameter determined by said compensation parameter setting unit, thereby outputting a conversion result,
wherein said detection-threshold setting unit sets the detection threshold such that the detection threshold becomes smaller when the characteristic amount becomes bigger.

2. The video signal converter as defined in claim 1, wherein said position parameter feeding unit feeds the position parameter so that the position parameter at the position of the target pixel follows a Gaussian distribution as a function of a distance from a specific point to the position of the target pixel on a display screen image which is constituted by the input video signal.

3. The video signal converter as defined in claim 1, wherein frequency components of the input video signal are used to determine the characteristic amount and the detection threshold.

4. The video signal converter as defined in claim 1, wherein average luminance of the input video signal is used to determine the characteristic amount and the detection threshold.

5. The video signal converter as defined in claim 1,
wherein said position parameter feeding unit further comprises an area dividing unit operable to divide a display screen image constituted by the input video signal into a plurality of areas,
wherein said characteristic amount calculating unit calculates the characteristic amount of the input video signal for each of the plurality of areas divided by said area dividing unit, and
wherein said position parameter feeding unit feeds the position parameter, depending on the position of the target pixel which is set by said target pixel setting unit for each of the plurality of areas divided by said area dividing unit.

6. The video signal converter as defined in claim 1, wherein said position parameter feeding unit comprises:
an area judging unit operable to determine, utilizing a template for detecting a specific object, an area where the specific object exists and an area where the specific object does not exist, in a display screen image constituted by the input video signal, thereby generating a judgment result; and
an area-based position parameter calculating unit operable to determine the position parameter based on the judgment result.

7. The video signal converter as defined in claim 1, further comprising:
an illuminance sensor; and
a detection-threshold compensating unit,
wherein said detection-threshold compensating unit compensates the detection threshold set by said detection-threshold setting unit, based on a detection result of said illuminance sensor, and
wherein said compensation parameter setting unit determines the compensation parameter, based on the position parameter fed by said position parameter feeding unit and on the detection threshold compensated by said detection-threshold compensating unit.

8. The video signal converter as defined in claim 1, further comprising:
a color converter operable to convert a color space of the input video signal into a first color space comprising a luminance component and non-luminance components; and
an inverse color converter operable to inversely convert a video signal in the first color space into the color space of the input video signal,
wherein the luminance component of the first color space converted by said color converter is used to determine the characteristic amount, the detection threshold, the compensation parameter, and the conversion result, and
wherein said inverse color converter converts inversely both of the conversion result outputted by said conversion unit and the non-luminance components of the first color space converted by said color converter, into the color space of the input video signal.

9. The video signal convertor as defined in claim 1, wherein said conversion unit outputs the conversion result such that the conversion result becomes greater when either the fed position parameter or the set detection threshold becomes greater, and
said conversion unit outputs the conversion result such that the conversion result becomes smaller when either the fed position parameter or the set detection threshold becomes smaller.

10. A video display device comprising:
a display device; and
a video signal converter operable to supply said display device with a video signal,
wherein said video signal converter comprises:
a target pixel setting unit operable to set a target pixel in an input video signal;
a position parameter feeding unit operable to feed a position parameter depending on a position of the target pixel set by said target pixel setting unit;
a characteristic amount calculating unit operable to calculate a characteristic amount of the input video signal;
a detection-threshold setting unit operable to set a detection threshold, based on the characteristic amount calculated by said characteristic amount calculating unit;

a compensation parameter setting unit operable to determine a compensation parameter, based on the position parameter fed by said position parameter feeding unit and on the detection threshold set by said detection-threshold setting unit; and a conversion unit operable to convert a signal of the target pixel set by said target pixel setting unit in the input video signal, based on the compensation parameter determined by said compensation parameter setting unit, thereby outputting a conversion result, wherein said detection-threshold setting unit sets the detection threshold such that the detection threshold becomes smaller when the characteristic amount becomes bigger.

11. The video display device as defined in claim 10, further comprising:

a selector operable to select alternatively the input video signal and the conversion result outputted by said video signal converter, thereby supplying said display device with the selected result; and a switching control unit operable to control said selector.

12. The video display device as defined in claim 11, further comprising an input unit operable to provide said switching control unit with switching directions for said selector, wherein said switching control unit controls said selector in accordance with the switching directions provided by said input unit, and wherein said switching control unit provides said display device with a status signal indicating a state of said selector.

13. The video display device as defined in claim 11, wherein said display device outputs a status signal to said switching control unit, based on switching directions for said selector, and wherein said switching control unit controls said selector, based on the status signal from said display device.

* * * * *